Patented Dec. 4, 1945

2,390,253

UNITED STATES PATENT OFFICE 2,390,253

SULPHONYL COMPOUNDS AND PROCESSES FOR THEIR PRODUCTION

Clyde O. Henke, Wilmington, Del., assignor to E. I. du Pont de Nemours & Company, Wilmington, Del., a corporation of Delaware No Drawing. Application November 11, 1943, Serial No. 509,900

9 Claims. (Cl. 260—552)

This invention relates to a class of new sulphonyl compounds and more particularly refers to new aliphatic and cycloaliphatic-N-sulphon ureas, thioureas, guanidines and related compounds, as well as processes for their preparation and use in the industrial arts.

The compounds of this invention, as far as is known, have never been described or suggested in the prior art. They possess varied and interesting properties which make them particularly adaptable for a wide variety of uses. For example, they possess capillary activity and are of value as wetting, washing, dispersing, emulsifying, levelling, softening, and waterproofing agents in the textile, leather, paper, mining and resin industries. They find further application in the dye, lacquer and rubber industries. They possess germicidal properties and consequently are of value in the fields of medicine and of insecticides. Not only are these properties inherent in the compounds themselves, but their value may be augmented by forming suitable derivatives. The urea portion of the molecule is reactive, and will undergo many of the reactions characteristic of urea, thus opening the way to numbers of new materials, all usable in the fields mentioned above. Other derivatives are possible by the reaction of substituents on the alkyl chain.

It is an object of this invention to produce a class of new compounds possessing the foregoing and additional properties. A further object is to produce a new class of sulpho-containing compounds which is of particular value for employment as surface-active agents. A still further object is to produce a class of compounds which may be used in place of soap and prior art soap substitutes and/or in admixture with said compounds for the various purposes wherein said compounds have previously been used or are capable of use. A still further object is to produce these compounds by a cheap and efficient process. Additional objects will become apparent from a consideration of the following specification and claims.

These objects are attained in accordance with the present invention, which is directed to compounds conforming to the following general formula:

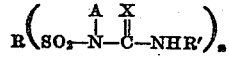

wherein R represents an aliphatic or cycloaliphatic radical; R' represents hydrogen or an aliphatic, cycloaliphatic or aromatic radical; A represents hydrogen, a metal or an ammonium radical; X represents oxygen, sulphur or an imino group; and n represents an integer from one to ten.

In a more restricted sense this invention is concerned with compounds of the foregoing type wherein R represents an aliphatic radical and A represents a hydrogen atom. In one of its more restricted embodiments the invention is concerned with compounds of the following general formula:

$$R-SO_2-NH-CO-NH_2$$

wherein R is an aliphatic radical. In another one of its more restricted embodiments this invention pertains to compounds of the following general formula:

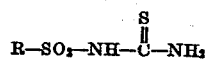

wherein R is an aliphatic radical. In one of its preferred embodiments the invention pertains to cetyl-N-sulphonurea and related compounds such as the other aliphatic homologs thereof and mixtures of said compounds.

The invention is also directed to cheap and efficient processes for producing the foregoing compounds and the many other compounds related thereto or suggested thereby. Additional embodiments of the invention concern the employment of said compounds for the purposes referred to previously and hereinafter or the utilization of said compounds as intermediates for the production of compounds which are particularly adaptable for employment as aforesaid.

The compounds of the present invention in their free or acid form may be designated by the general formula

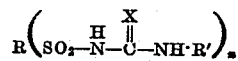

where R is an aliphatic or cycloaliphatic radical; X is O, S, NH; R' is H, or an aliphatic, cycloaliphatic or aromatic radical; n is an integer from 1 to 10. The salts are formed by replacing the H on the amido nitrogen with a cation. Both R and R' may be substituted by hetero atoms, such as Cl.

It has been discovered that these compounds may be prepared by reacting aliphatic or cycloaliphatic sulphonamides $R(SO_2NH_2)_n$ with ureas, urethanes, thioureas, and guanidines containing at least one unsubstituted amino group or with cyanates, isocyanates, or their sulphur analogs.

Thus, when these sulphonamides are reacted with ureas, cyanates, isocyanates, and urethanes the following reactions occur:

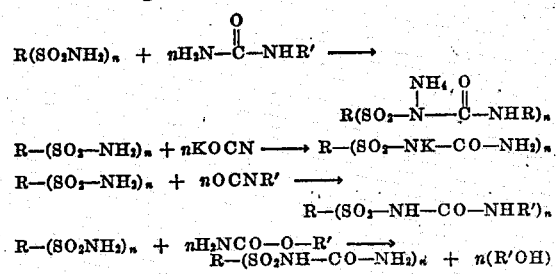

Similar reactions occur when the thio or imino analogs of the above materials are used; for example,

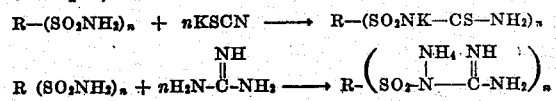

In the above formulas, R is an aliphatic or cycloaliphatic radical; R' is an aliphatic, cycloaliphatic or aromatic radical; $n$ is an integer from 1 to 10.

Reaction of all the sulphonamide groups in the polysulphonamide with the urea-forming compound need not occur; for example,

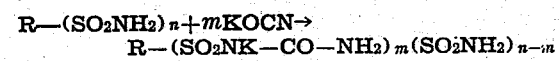

where $n$ and $m$ are integers with $m$ less than $n$.

The preparation of these materials involves an unusual and unexpected reaction. The acid chlorides of aliphatic sulphonic acids, especially of the poly-derivatives of longer chain hydrocarbons, are somewhat inert in many reactions; for example, in preparing an amide, use of the aqueous ammonation employed successfully with aromatic sulphonyl halides, results in considerable hydrolysis, in preference to amidation. Reaction of the sulphonyl chloride with urea similarly is difficult, leading to undesirable by-products, and attempts to prepare sulphon-ureas by this method generally are unsuccessful.

Another surprising thing about the reaction is that the aliphatic radical, which usually tends to reduce the acidity of the acid radical, permits sufficient acidity of the amido hydrogen atoms to cause the reaction to proceed.

The potassium, sodium, ammonium and similar salts, which, as illustrated above, are formed directly in many of the reactions, are readily soluble in water until a ratio of carbon atoms to sulphon-urea groups of about 16:1 is reached, and with a more limited solubility at higher ratios. The sulphon-ureas appear to have somewhat more aqueous solubility and to produce greater foaming than the sulphon-thioureas. On the other hand, the thioureas appear to have greater germicidal and insecticidal activity.

For use as detergents, wetting and emulsifying agents those compounds are preferred in which R is aliphatic with 8 or more carbon atoms in the chain. For insecticidal use, chain length has practically no limitation.

When the aqueous solutions of the N-sulphonurea salts are acidified, as with acetic acid, the free urea precipitates. The free urea is an acid appreciably stronger than carbonic acid, as it dissolves in dilute sodium or potassium carbonate solution with the evolution of carbon dioxide to form nearly neutral solutions. However, the acidity does not approach that of carboxy or sulphonic acids, and it has no tendering effect on fabrics or paper. Consequently this limited acidity affords an extremely advantageous means of forming aqueous solutions for use in the textile, paper and leather fields.

The compounds are prepared by a simple procedure. It consists essentially of heating the sulphonamide and the urea-forming compound for varying periods of time in a solvent in which both materials are at least partially soluble. Throughout the present specification and claims the term "urea-forming" compound is understood to mean ureas, cyanates, isocyanates, urethanes and their thio and imino analogs. The temperatures used are above 50° C. (degrees centigrade) and may be as high as 200° C., but the preferred range is 80 to 120° C. The determining factors in the choice of temperature are the solubility of the reactants and the ease of reaction. The solvents used may vary, the chief requisites being that they at least partially dissolve each reactant and do not change the nature of the product; also, they should boil above 50° C. The solvents usually used are alcohols. Ethyl alcohol is preferred in most cases, although it is sometimes desirable to shorten the reaction time by increasing the reaction temperature, and in this case higher boiling alcohols, such as butyl, are more advantageous. The alcohol is usually not anhydrous, but contains 5–30% water. The time of reaction varies from one to eighteen hours, depending upon the temperature of reaction, and the activity of the reactants; the usual time is three to six hours. The reaction is sometimes carried out in the presence of a basic material, such as the carbonates of sodium or potassium. This is especially helpful when urea, nitro urea, or thiourea is one of the reactants.

The proportions of the reactants may be varied. The usual proportion is one to two moles of the urea-forming reactant for each sulphonamide group present in a mole of the hydrocarbon-sulphonamide.

However, in those cases in which only a few of the sulphonamide groups in a hydrocarbon polysulphonamide are desired to be converted to sulphon-ureas, only 1 to 1.1 mole of urea-forming material is used for each such sulphonamide group.

The sulphonamides used are either aliphatic or cycloaliphatic. A few of these, cited as examples and not limiting the invention, are ethane-mono-sulphonamide, propane-di-sulphonamide, butane-mono - sulphonamide, hexane - mono-sulphonamides, hexane-di-sulphonamides, chlorohexane-mono - sulphonamide, chloro - propane-mono-sulphonamide, decane - mono - sulphonamide, chloro-hexadecane-mono-sulphonamide, paraffin wax mono-sulphonamide, chlor-paraffin wax tetra-sulphonamide, cyclohexane mono-sulphonamide, cyclohexane-di-sulphonamide, etc. The alkyl radical may be straight or branched. The alkyl or cycloaliphatic chain need not be entirely hydrocarbon but may be interrupted or substituted by hetero atoms such as, for example, sulphur, nitrogen, oxygen, chlorine, bromine or iodine. This radical may be unsaturated as well as saturated, but the latter is preferred. It may be obtained by the treatment of the appropriate starting material with sulphur dioxide and chlorine under the influence of light followed by the treatment of the resulting sulphone chloride with liquid ammonia or ammonia in a non-aqueous solvent; aqueous ammonia may be used only under certain conditions.

In addition to the above sulphonamides, those prepared from the sulphonyl chlorides disclosed in U. S. Patents 2,174,492; 2,174,505; 2,174,506; 2,174,507; 2,174,508; 2,174,509; 2,197,800; 2,212,786; 2,263,312; 2,321,022; 2,193,824; 2,202,791; 2,265,163; 2,142,934; 2,146,744; 2,147,346 and 2,174,856 may be used, either alone, in admixture with one another and/or in admixture with the sulphonamides referred to previously.

The urea-forming material may be any of those compounds which form cyanic acid, isocyanic acid or substituted cyanic or isocyanic acids, during the reaction with the sulphonamide. Similarly the thio-urea analogs are derived from materials forming thiocyanic acid or isocyanic acid or such substituted acids. Although other materials may be used to prepare the imino-urea analogs the most convenient one is guanidine. A few representative examples of other urea-forming reactants are: urea, nitro-urea, potassium cyanate, ethyl isocyanate, phenyl isocyanate, ethyl thiocyanate, allyl-isothiocyanate, ethyl urethane, phenyl urethane, ethyl urea, asymmetric di-ethyl urea and decylphenyl-guanidine, and the like.

The invention may be more readily understood by a consideration of the following illustrative examples, in which the quantities are stated in parts by weight.

EXAMPLE 1

Cetyl-N-sulphonurea 2.5 parts by weight of cetyl sulphonamide and 1.5 parts by weight of potassium cyanate are refluxed in 25 parts of ethyl alcohol (95%) (per cent) for 3½ hours. The alcohol is then cooled to room temperature and the white solid, the potassium salt of cetyl-N-sulphonurea, is filtered off. It is easily soluble in warm water. When the solution is acidified with acetic acid, the free acid form of cetyl-N-sulphonurea precipitates out in fine white crystals. It is filtered off and recrystallized from methyl alcohol; the crystals melt at 156–157° C. It dissolves in weakly alkaline water to form solutions with excellent foaming and detergent properties.

EXAMPLE 2

Propane-1,3-di-sulphonurea

Ten parts of propane-1,3-disulphonamide and ten parts of potassium cyanate are refluxed in 70 parts of 95% alcohol for 6 hours. The materials do not entirely dissolve. After cooling to room temperature, the alcohol is decanted and the residue dissolved in 200 parts of water. When acidified with dilute hydrochloric acid, propane 1,3-di-(N-sulphonurea) is precipitated. It is filtered off and crystallized from boiling water. The white crystalline solid melts at 185–187° C. with decomposition. Analysis: nitrogen found = 19.38%; nitrogen calculated = 19.44%. The solid dissolves in dilute carbonate solution with the evolution of foam. The solution does not manifest the detergent action of cetyl-N-sulphonurea.

EXAMPLE 3

Cyclohexane-N-sulphonurea

Twenty-five parts of cyclohexane mono-sulphonamide and 13.8 parts of potassium cyanate were refluxed in 80 parts of 95% ethyl alcohol for 12 hours. The alcohol was cooled to room temperature and the white product filtered off. It was dissolved in 25 parts of hot water and then precipitated by cooling and acidifying with acetic acid. Upon filtration, 16 parts of a soft crystalline white solid were obtained.

EXAMPLE 4

Butane-N-sulphon-thio-urea

Sixty-nine parts of butane-mono-sulphonamide and 58 parts of potassium thiocyanate are refluxed six hours in 400 parts of 95% alcohol. Practically everything is in solution. The alcohol solution is cooled to −40° C. and the precipitated white solid is filtered off. The product analyzes 26.53% sulphur and 11.87% nitrogen, whereas the calculated values are 27.35% sulphur and 11.96% nitrogen.

EXAMPLE 5

Hexane-N-sulphonurea

Eighty-one parts of hexane-mono-sulphonamide and 36 parts of urea are refluxed in 400 parts of 95% ethyl alcohol for 6 hours. A slight sediment is filtered off and the solution evaporated. The residue is dissolved in methanol and cooled in a dry-ice chloroform bath to −25° C. A small amount of white solid is filtered off and the filtrate evaporated and dried. There was obtained 93 parts of a brown, viscous oil. It analyzes 15.55% sulphur and 14.67% nitrogen; this compares fairly closely to the free sulphonurea, which analyzes 15.38% sulphur and 13.45% nitrogen. Evidently the alcoholic reflux tends to eliminate ammonia from the ammonium salt. This product dissolved in dilute carbonate to give a solution which gave some foam when shaken.

EXAMPLE 6

Paraffin wax penta-(N-sulphonurea)

One-hundred and sixty-eight parts of paraffin wax polysulphonamide averaging 4.7 sulphonamide groups per molecule and 162 parts of potassium cyanate are refluxed in 400 parts of 95% ethyl alcohol for 16 hours, maintaining agitation meanwhile. At the end of that time the product has precipitated in a gummy mass. The alcohol is decanted from the brown solid. The solid is dissolved in 500 parts of water, and then precipitated by the addition of acetic acid. The precipitated material was washed twice with 200 parts of water and then dried in a vacuum oven at 55° C. One-hundred and thirty-eight parts of a tan brittle solid were thus secured. It dissolved readily in dilute carbonate solution. The solution foamed when shaken.

It is to be understood that the foregoing examples are illustrative merely of a few of the many modifications embraced within the scope of this invention. These examples may be varied widely with respect to the individual reactants, the amounts thereof and the conditions of reaction without departing from the scope hereof. Certain of these modifications have been referred to previously but it is to be understood that the invention is not restricted thereto, since other modifications and variations will be obvious to one familiar with this art from a consideration of the instructions hereof.

In accordance with the present invention a new class of compounds having a variety of highly useful properties has been discovered; likewise, new and economical processes for the preparation of these compounds have been disclosed. These compounds are of particular value as capillary-active agents, which properties permit their use in place of or in addition to soaps and soap substitutes of the prior art for the innumerable purposes wherein said compounds have previously been used or are capable of use. They are of particular value as wetting, dispersing, emulsifying and detergent agents. Likewise they possess and can be converted to derivatives which possess germicidal, insecticidal, and fungicidal activity. Consequently they are adaptable to numerous uses in the pharmaceutical and other fields.

As many widely different embodiments of this invention may be made without departing from the spirit and scope hereof, it is to be understood that the invention is not limited to the specific embodiments hereof except as defined in the appended claims.

I claim:

1. Compounds conforming to the following general formula:

$$R-SO_2-NH-CO-NH_2$$

wherein R is a member selected from the class consisting of aliphatic hydrocarbon radicals and cycloaliphatic hydrocarbon radicals.

2. Compounds conforming to the following general formula:

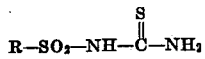

wherein R is a member selected from the class consisting of aliphatic hydrocarbon radicals and cycloaliphatic hydrocarbon radicals.

3. Cetyl-sulphonurea, having the formula $C_{16}H_{33}-SO_2-NH-CO-NH_2$.

4. A process for producing sulphonyl compounds which comprises heating a member selected from the group consisting of aliphatic sulphonamides and cycloaliphatic sulphonamides with a member selected from the class consisting of cyanates, isocyanates, thiocyanates and isothiocyanates in a solvent for the two reactants.

5. A process which comprises heating cetyl sulphonamide and potassium cyanate in the presence of ethyl alcohol.

6. Compounds conforming to the following general formula:

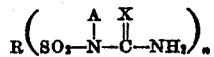

wherein R represents an aliphatic hydrocarbon radical; A represents a member selected from the class consisting of hydrogen and alkali metals; X represents a member selected from the class consisting of oxygen and sulphur groups; and n represents an integer from one to five.

7. Compounds conforming to the following general formula:

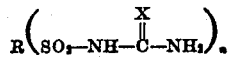

wherein R represents an aliphatic hydrocarbon radical; X represents a member selected from the class consisting of oxygen and sulphur groups; and n represents an integer from one to five.

8. Cyclohexane-sulphonurea, having the formula $C_6H_{11}-SO_2-NH-CO-NH_2$.

9. Butane-sulphonthiourea, having the formula $C_4H_9-SO_2-NH-CS-NH_2$.

CLYDE O. HENKE.